United States Patent [19]

Donahue

[11] Patent Number: 5,400,702
[45] Date of Patent: Mar. 28, 1995

[54] BAGEL BOARD TURNING DEVICE

[76] Inventor: Jere M. Donahue, P.O. Box 456, Windham, N.H. 03087

[21] Appl. No.: 130,794

[22] Filed: Oct. 4, 1993

[51] Int. Cl.$^6$ .............................................. A21B 1/44
[52] U.S. Cl. ....................................... 99/427; 99/352; 99/393
[58] Field of Search ................. 99/427, 395, 397, 398, 99/352, 393, 391, 392, 399

[56] References Cited

U.S. PATENT DOCUMENTS

| | | | |
|---|---|---|---|
| 1,517,795 | 12/1924 | Morrisson et al. | 99/397 |
| 2,614,483 | 10/1952 | Scofield | 99/393 |
| 2,826,981 | 3/1958 | Chick | 99/397 |
| 2,940,439 | 6/1960 | Bartels et al. | 99/397 |
| 3,096,707 | 7/1963 | Mills | 99/395 |
| 4,492,152 | 1/1985 | De Santis | 99/397 |
| 4,562,771 | 1/1986 | Williams | 99/397 |
| 4,790,241 | 12/1988 | Lugo | 99/352 |
| 4,944,282 | 7/1990 | Aguiar et al. | 99/397 |

*Primary Examiner*—Timothy F. Simone
*Assistant Examiner*—Patrick F. Brinson
*Attorney, Agent, or Firm*—William Nitkin

[57] ABSTRACT

A bagel board turning device having a plurality of bagel boards with bagels placed thereon, each bagel board rotatable on its central longitudinal axis with gears to simultaneously rotate the bagel boards along their longitudinal central axes to deposit the bagels directly under their respective bagel boards.

5 Claims, 3 Drawing Sheets

BAGEL BOARD TURNING DEVICE

BACKGROUND OF THE INVENTION

1. Field of the Invention

The device of this invention resides in the area of equipment for the baking of pre-boiled bagels and more particularly relates to a bagel board turning device which allows for the turning of multiple bagel boards within an oven environment.

2. Description of the Prior Art

Bagel boards originally were, and in many cases still are, wooden pallets on which rows of bagels, after boiling, are inserted into a traditional oven for baking. In the prior art, after the bagels dry on one side by the oven's heat, the bagel boards are manually flipped over so that the bagels fall off onto the shelf of the oven on their other side so that the bagels can be baked.

The prior art for bagels cooked in rotary ovens includes U.S. Pat. No. 4,790,241 to John Lugo for a Bagel Board Device. This patent discloses a structure having a carriage with boards pivotally mounted on one side by a system of levers to support and turn over the bagels thereon onto the oven shelf below. However, once inserted into the oven, this prior art device is both difficult to reach and to move the mechanism to turn the bagel boards. Not only is it inconvenient and uncomfortable to reach into a hot oven and difficult to manipulate the mechanism to turn the boards, but also utilization of the Lugo device requires a baker to have an extremely long reach as well as great strength. A baker of short stature must literally extend his upper torso into the oven to operate the Lugo device. Moreover, since great force must be exerted as the bagel boards are hard to turn, such force moves the entire Lugo carriage laterally, requiring that expensive customization be done to install side rails to retain the carriage in place on each oven shelf of the rotary oven. A further customization of the oven required by the use of the Lugo device therein is the lowering of the peel plate of the oven to allow better access by the baker so that the baker can then bend at the waist in order to more easily reach in and operate the Lugo device.

Lugo pivots its bagel boards along a side edge of each board by a complex system of levers which movement allows the bagels to come off each board onto the rotary oven shelf in a position off to the side of the original position of each board. The endmost area of the Lugo device cannot be used for a bagel board to be positioned in as this endmost area must be available for a row of bagels to be deposited onto from the bagel board adjacent to such endmost area.

SUMMARY OF THE INVENTION

It is an object of this invention to provide an improved bagel board turning device for insertion into rotary ovens as well as traditional ovens. The device of this invention can be operated easily without having to reach into a hot oven and thus can be operated by those bakers not possessing great strength or a long reach.

It is a further object of this invention to provide a bagel board turning device which will increase the production of bagels compared to prior art devices.

To accomplish the goals of this invention, a frame is provided with a plurality of parallelly disposed bagel boards, each mounted with a shaft centrally disposed thereunder along the longitudinal center axis of each board. Each shaft, having a first and second end, is interengaged at its first end through one of a plurality of gears to an interconnected gear rack. A separate elongated handle is utilized to rotate one gear 180 degrees and consequently the shaft of one of the plurality of bagel boards, which in a preferred embodiment is a centrally positioned bagel board. By such rotation the gear moves the interconnected rack located thereabove extending along one side of the frame which rack in turn rotates the other gears, each disposed on the first end of each bagel board shaft, as well as their corresponding bagel boards. The shafts, being centrally disposed along the central longitudinal axis of each bagel board, rotate the bagel boards 180 degrees quickly and easily, causing the bagels to fall off each bagel board neatly, directly thereunder. Because the bagel boards are rotated so quickly, the bagels do not slide off the bagel board during rotation, but are flipped 180 degrees and fall directly under their respective bagel boards to the oven shelf of a rotary oven or the oven floor of a traditional oven. The frame in which the bagel boards are mounted has a pair of rear wheels and has a space formed thereunder so the device can be removed from the oven for restocking with preboiled bagels by being rolled out over the bagels without disturbing them once the bagels have been rotated and have fallen off their respective bagel boards onto an oven shelf of a rotary oven or stationary oven floor.

DESCRIPTION OF THE PREFERRED EMBODIMENT(S)

Figure 1:
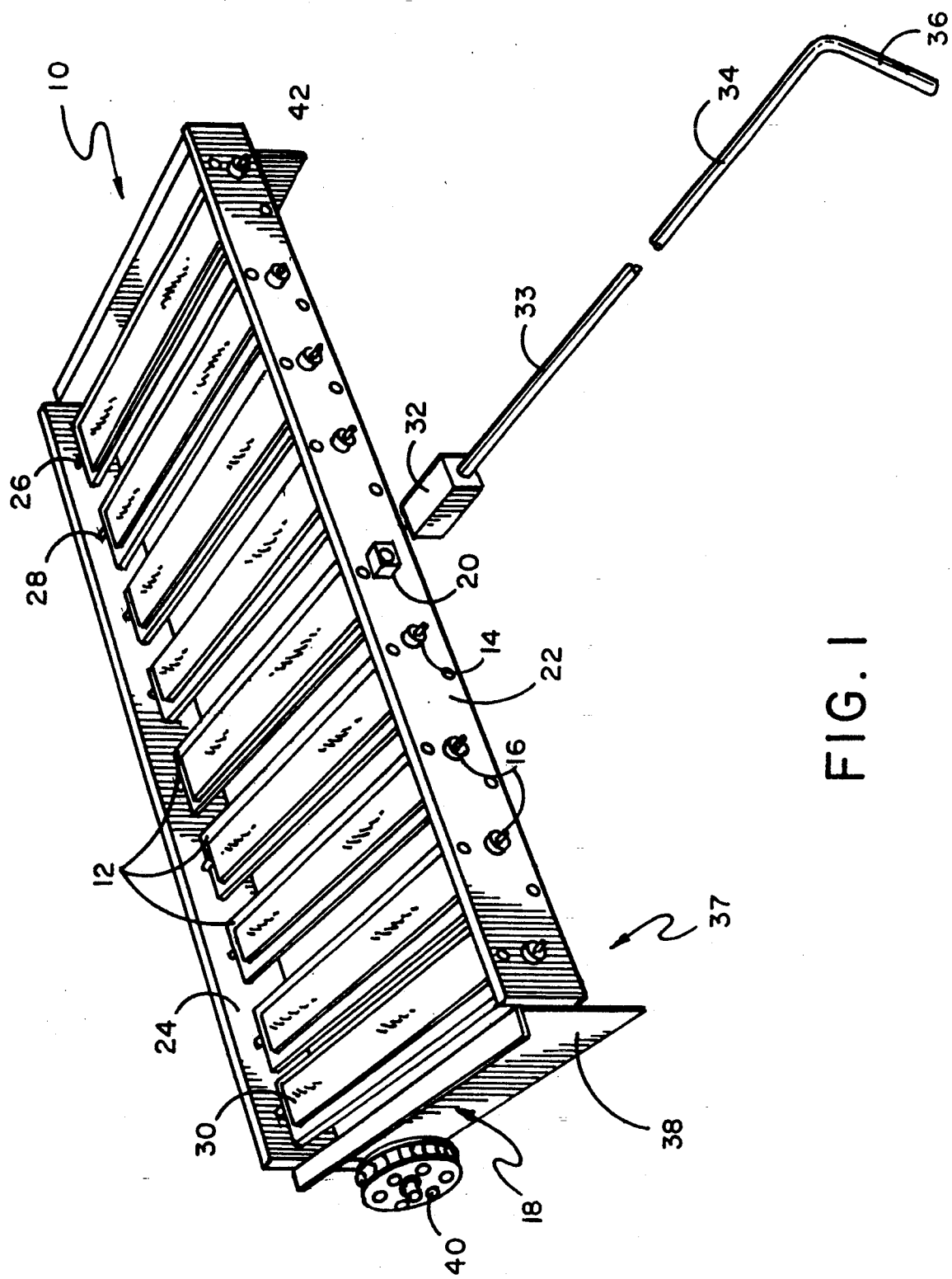
FIG. 1 illustrates a perspective view of the bagel board turning device of this invention.

FIG. 1 illustrates a perspective view of the bagel board turning device 10 of this invention for use in both rotary ovens as well as traditional ovens. Disposed within frame 18 is a plurality of parallelly positioned bagel boards 12 which are each positioned on a shaft, such as shaft 26 or shaft 28, which extends longitudinally and is attached under the center axis of its respective bagel board. Although the device of this invention is described herein as being used on shelves in a rotary oven, the device can also be utilized in a traditional oven. On top of each bagel board, which can be made of metal, can be a canvas strip 30, the surface texture of which aids the bagels in not adhering to the metal surface of the board. On front side wall 22 of the device can be seen shafts, such as shafts 14, 16 and 18, each having first and second ends, the first ends of which protrude through apertures in front side wall 22. In a similar fashion the second ends of the shafts protrude through corresponding apertures in rear side wall 24 such that each shaft can rotate therein and each bagel board is rotatable. Front side wall 22 and rear side wall 24 are attached to first and second end walls 38 and 42 at a height sufficient for the bagel boards to rotate 180 degrees and for the distance from the oven shelf to the bottoms of the front side wall and rear side wall to be greater than the height of any bagels deposited on the oven shelf. The bagel boards are supported a distance above the rotary oven shelf by first and second end walls 38 and 42 sufficient to allow the bagels to be flipped 180 degrees onto the rotary oven shelf or oven floor. Two wheels or equivalent means to roll the device are provided. When the device is to be removed from the oven, it is lifted somewhat at its front side wall end and pulled on its two wheels located at the rear of the device, one of which wheels 40 can be seen in FIG. 1. The device can be rolled out of the oven and over the baking bagels resting on the shelf or oven floor, restocked with boiled bagels and reinserted onto a next-in-rotation rotary oven shelf. Centermost protruding shaft 50, seen in FIG. 2, has a rectangular engagement member 20 disposed thereon which is engageable with wrench member 33 having an elongated shaft 34 terminating in handle 36. End portion 32 of wrench member 33 fits over and engages onto rectangular engagement member 20 such that when wrench member 33 is rotated, it causes rotation of rectangular engagement member 20 and its attached shaft and bagel board. Other shapes for engagement member 20 and end portion 32 can be utilized.

Figure 2:
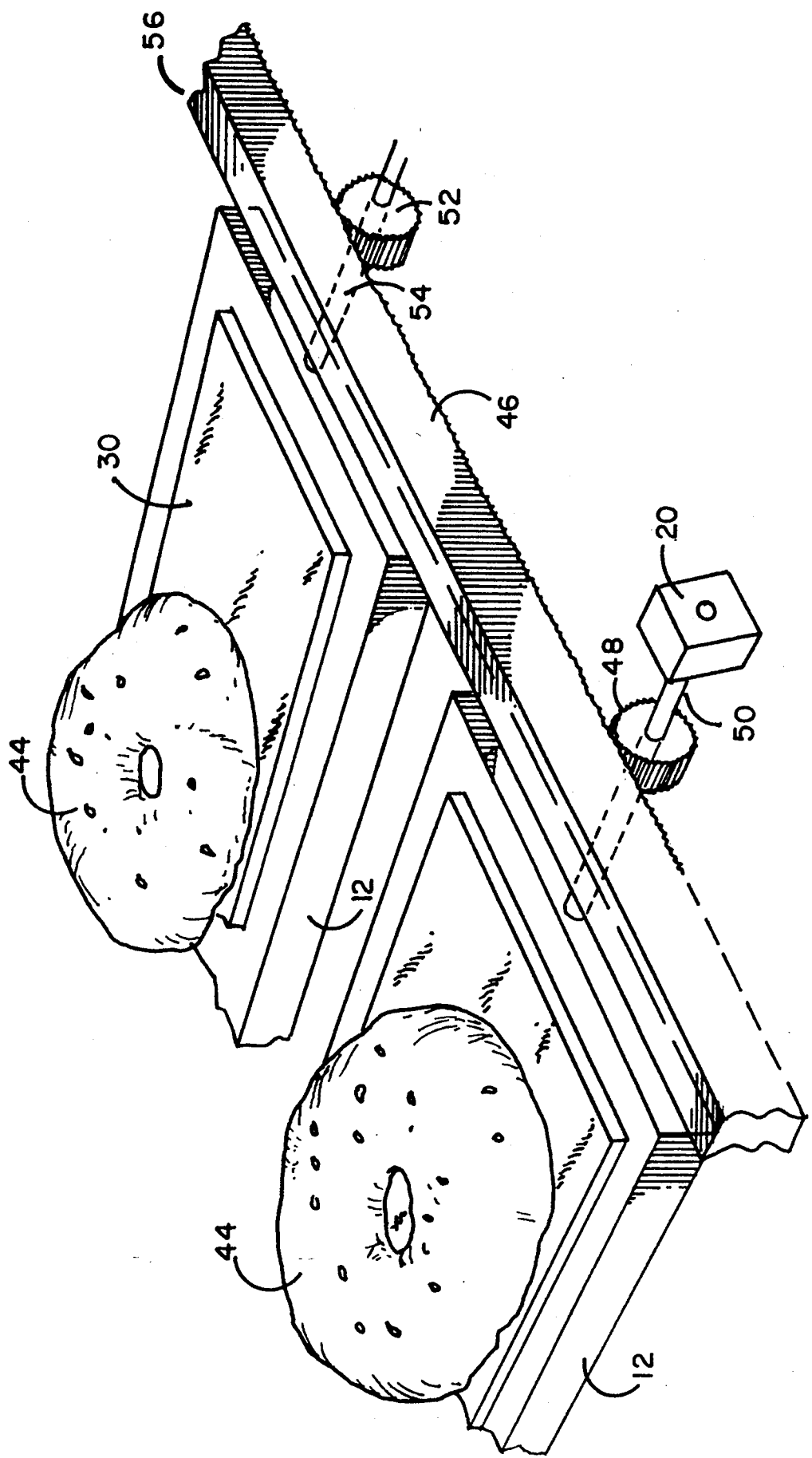
FIG. 2 illustrates a perspective view of an enlarged section of the device of this invention with portions cut away, such view showing bagels placed on segments of the bagel boards.
Figure 3:
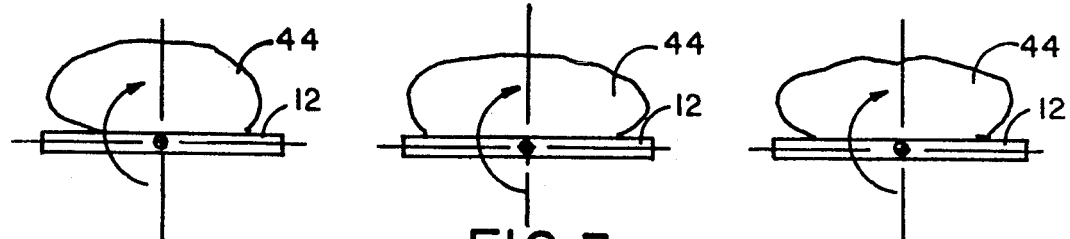
FIG. 3 illustrates a side end view through a plurality of bagel boards showing the direction of rotation of the boards.
Figure 4:
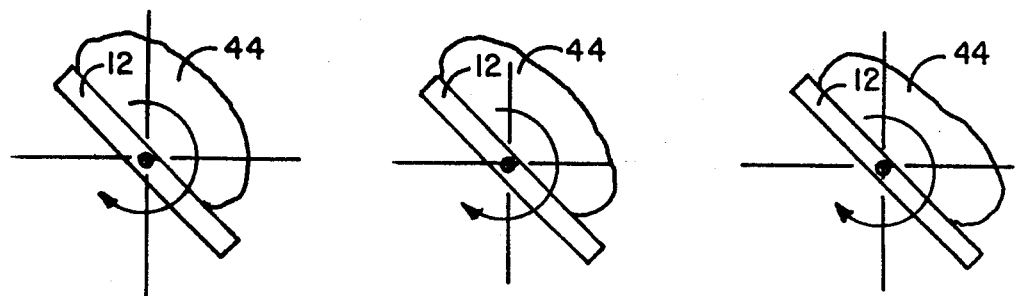
FIG. 4 illustrates a plurality of bagels on the bagel boards seen in FIG. 3 showing the bagel boards starting to rotate.
Figure 5:
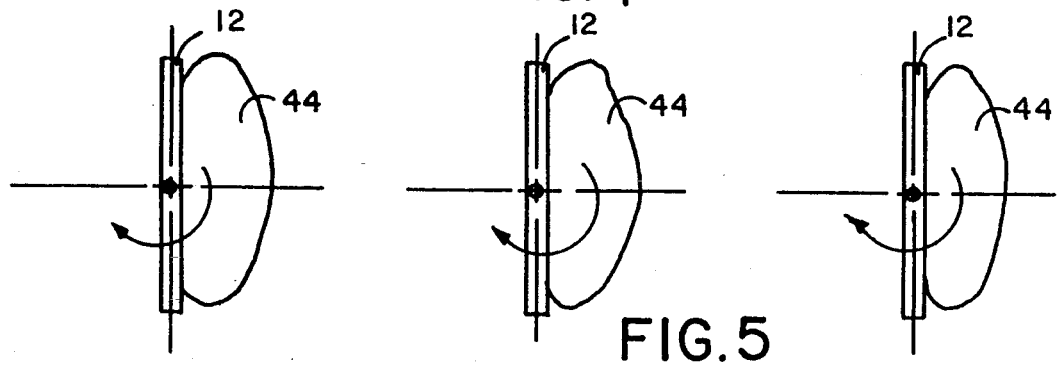
FIG. 5 illustrates the bagel boards of FIG. 3 halfway through their rotation.
Figure 6:
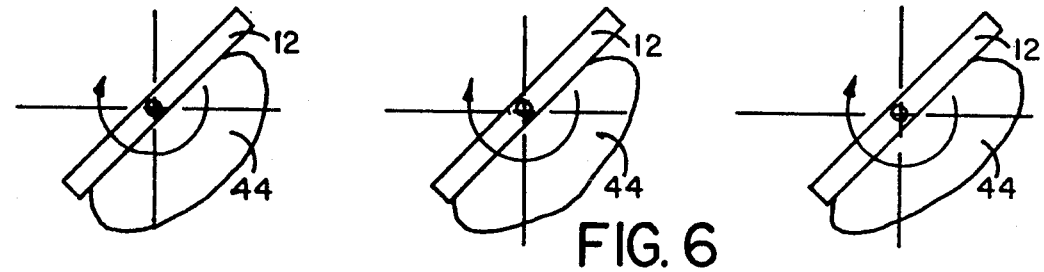
FIG. 6 illustrates the bagel boards' further rotation of the bagel boards seen in FIG. 5 with the bagels about to fall off.
Figure 7:
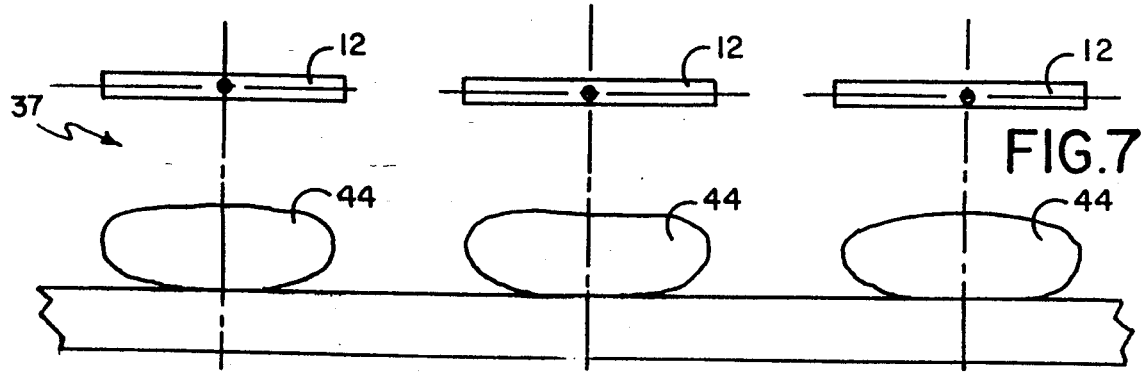
FIG. 7 illustrates the bagels having fallen off directly under their respective bagel boards and resting on a rotary oven shelf.

A close-up view of rectangular engagement member 20 is seen in FIG. 2 mounted on the end of shaft 50. Positioned behind front side wall 22, not seen in this view, is toothed gear 48. Above gear 48 is slideable rack 46. To the right of gear 48 is gear 52. Rack 46 passes above each gear and the teeth of the rack are interengaged with the teeth of each gear so that when rectangular engagement member 20 is rotated, for example, clockwise to the right 180 degrees, it drives rack 46 to the right and thereby rotates all the other gears on each of their respective shaft members a similar amount of rotation which action will then rotate bagel boards 12 180 degrees, causing bagels 44 to drop off their bagel boards upside down onto the oven shelf or floor below. This action causes pivoting of the shaft under the center of each board, rotating each bagel board around its center which allows the bagels to fall almost directly beneath each respective board. FIG. 3 illustrates an end view of bagel boards 12 with bagels 44 thereon and the clockwise rotation of the bagel boards. In FIG. 4 the bagel boards are shown starting to rotate. FIG. 5 illustrates the bagels held against their respective bagel boards by centripetal force of the rotation. In FIG. 6 the bagel boards have sufficiently rotated to the point where the bagels will now fall off directly within space 37 as seen in FIG. 7, onto rotary oven shelf 45 or oven floor. Space 37 is the space bounded by rear side wall 24, front side wall 22, first and second end walls 38 and 42 and the bottoms of the bagel boards. After the bagels have been deposited, the bagel board turning device of this invention can then be removed from the oven to be restocked with pre-boiled bagels by picking up the front side end with gloves to prevent burns and rolling it outward on its rear wheels while the bagels remain baking undisturbed on the oven shelf or floor. The device only needs to stay within the oven while the tops of the bagels are drying.

Unlike the prior art Lugo device the device of this invention utilizes all spaces within its frame because Applicant's device with its centrally rotating bagel boards deposits the bagels not at the side adjacent to its respective bagel board but directly under its respective bagel board because of the quick and easy central rotation thereof by elongated handle 34, thereby increasing by one full board's length of bagels the number of bagels that can be cooked on each rotary oven shelf each time the bagel board turning device is utilized, thereby increasing bagel production and realizing energy and cost efficiencies.

As discussed above, the device can be made of metal. The front side wall and rear side wall can be attached to the first and second end walls by welding or other equivalent attachment means. The shafts can also be attached to their respective bagel boards by welding or equivalent attachement means. Rack 46 and retention strip 56 of metal above it seen in FIG. 2 can be composed of different metals which difference in composition reduces friction and allows for easy lateral sliding of the rack thereunder and subsequent easy rotation of the bagel boards.

Although the present invention has been described with reference to particular embodiments, it will be apparent to those skilled in the art that variations and modifications can be substituted therefor without departing from the principles and spirit of the invention.

I claim:

1. An improved bagel board turning device for use in an oven having an oven shelf, comprising:
   a frame having a front side wall, a rear side wall, and first and second end walls, said front side wall and rear side walls in parallel relationship with one another, and said first and second end walls in parallel relationship with one another, said front side wall and said rear side wall attached to said first and second end walls, said first and second end members walls forming support means for said device;
   a plurality of bagel boards, each having first and second ends, said bagel boards for the placement of bagels thereon, each bagel board having a longitudinal central axis, said first end of said bagel boards rotatably attached on said central axis to said front side wall and said second ends of said bagel boards rotatably attached on said central axis to said rear side wall; and
   means to centrally rotate simultaneously said plurality of bagel boards along their longitudinal axes to deposit said bagels placed thereon directly under their respective bagel boards on said oven shelf.

2. The device of claim 1 further including a separate wrench substantially disposed outside said oven with a portion positioned within said oven, said wrench having an elongated handle to engage within said oven and operate said means to rotate simultaneously said plurality of bagel boards.

3. An improved bagel board turning device for use in an oven having an oven shelf, comprising:
   a frame having a front side wall having a bottom, a rear side wall having a bottom, and first and second end walls, said front side wall and rear side walls in parallel relationship with one another, and said first and second end walls in parallel relationship with one another, said front side wall and said rear side wall attached to said first and second end walls, said first and second end walls forming support means for said device;

a plurality of bagel boards for the placement thereon of a plurality of bagels, each bagel having a height, each bagel board having a longitudinal central axis and a length;

a plurality of shafts, each having a length and first and second ends, each shaft associated with one of said bagel boards, each of said shafts centrally attached and disposed longitudinally under one of said bagel boards on its central axis, the length of each of said bagel boards being shorter than the length of its attached shaft;

a plurality of apertures defined in said front side wall and a corresponding number of apertures defined in said rear side wall, said apertures positioned opposite one another forming a plurality of pairs of corresponding apertures, each of said shafts positioned respectively in one of said pairs of apertures with said plurality of bagel boards extending in parallel relationship to one another and to said first and second end walls between said front side wall and said rear side wall;

a plurality of gear members disposed at said first ends of said shafts, each of said gear members in contact with and in communication with one of said shafts;

a rack member laterally and slideably disposed in parallel relationship to said front side wall, said rack contacting and engaging each of said gear members;

engagement means positioned on said first end of one of said shafts;

a wrench member engageable with said engagement means to rotate its associated shaft and gear member to laterally move said rack member and said plurality of gear members engaged thereto to rotate said plurality of shafts and to rotate each bagel board simultaneously and deposit said bagels directly under their associated bagel boards; and a space defined between said first and second end walls of said frame, beneath said bagel boards, and above said oven shelf, the distance between said bagel boards and said oven shelf sufficient to allow for a 180 degree rotation of said bagel boards with bagels thereon and for said bagels to be deposited directly under their associated bagel boards.

4. The device of claim 3 further including means to roll said device in and out of said oven.

5. The device of claim 4 wherein the distance between said oven shelf and the bottom of said front side wall and the distance between said oven shelf and the bottom of said rear side wall is each greater than the height of any bagel deposited on said oven shelf to allow said device to be rolled out of said oven without disturbing said bagels deposited on said oven shelf.

* * * * *